(12) United States Patent
Lee

(10) Patent No.: US 8,817,383 B2
(45) Date of Patent: Aug. 26, 2014

(54) ZOOM PROJECTION LENS FOR PROJECTOR

(75) Inventor: Tsan-Haw Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 177 days.

(21) Appl. No.: 13/456,598

(22) Filed: Apr. 26, 2012

(65) Prior Publication Data

US 2012/0275034 A1    Nov. 1, 2012

(30) Foreign Application Priority Data

Apr. 29, 2011 (TW) ............................. 100115112 A

(51) Int. Cl.
*G02B 15/177* (2006.01)

(52) U.S. Cl.
USPC .......................................................... 359/689

(58) Field of Classification Search
USPC .................................................. 359/689, 784
See application file for complete search history.

(56) References Cited

U.S. PATENT DOCUMENTS 7,667,898 B2 * 2/2010 Minefuji ...................... 359/680

* cited by examiner

*Primary Examiner* — Joseph P Martinez
(74) *Attorney, Agent, or Firm* — Tracy M. Heims; Apex Juris, pllc

(57) ABSTRACT

A zoom projection lens for a projector includes a first lens group having a negative refractive power, a second lens group having a positive refractive power, and a third lens group having a positive refractive power in order along an optical axis from an object side to an image side. The first lens group has an aspheric lens. The third lens group has an aspheric lens and an aperture stop. F-number of the zoom projection lens in wide-angle is less than 2.1, i.e. enlarging a diameter of the aperture stop, to increase the optical efficiency of the projector. Besides, the aspheric lenses may reduce the aberration because of the large aperture stop.

9 Claims, 13 Drawing Sheets

ZOOM PROJECTION LENS FOR PROJECTOR

BACKGROUND OF THE INVENTION

1. Field of the Invention

The present invention relates generally to a zoom projection lens, and more particularly to a zoom projection lens for a projector.

2. Description of the Related Art

In recent days, cathode ray tube (CRT) is replaced by liquid crystal display (LCD), digital light processing (DLP), and other lighter and thinner projecting devices.

In a DLP, chief ray of a non-telecentric system is not parallel to an optical axis so that a zoom lens of the non-telecentric system has one less total reflection prism than a zoom lens of a telecentric system to reduce the cost. Besides, because the chief ray of the non-telecentric system is not parallel to the optical axis, the chief ray enter the zoom lens with a predetermined angle that will make the image projected on the screen shifting upward to meet the requirement of above front projector.

A conventional non-telecentric front projector, which is taught in Taiwan patent 1288290, uses high pressure mercury lamps. Because of the cost, it usually has a small aperture stop, and large F-number, typically is greater than 2.4.

As the improvement of various light sources, more and more manufacturers concern about how to provide a zoom projection lens which may use different light sources and keep a high light efficiency.

SUMMARY OF THE INVENTION

The primary objective of the present invention is to provide a zoom projection lens for a projector, which may use different light sources and keep a high light efficiency.

According to the objective of the present invention, a zoom projection lens for a projector includes a first lens group having a negative refractive power, a second lens group having a positive refractive power, and a third lens group having a positive refractive power in order along an optical axis from an object side to an image side. The first lens group has an aspheric lens. The third lens group has an aspheric lens and an aperture stop. F-number of the zoom projection lens in wide-angle is less than 2.1.

The function of the present invention is reducing F-number of the zoom projection lens, i.e. enlarging a diameter of the aperture stop, to increase the optical efficiency of the projector. Besides, the aspheric lenses may reduce the aberration because of the large aperture stop.

DETAILED DESCRIPTION OF THE INVENTION

Figure 1:
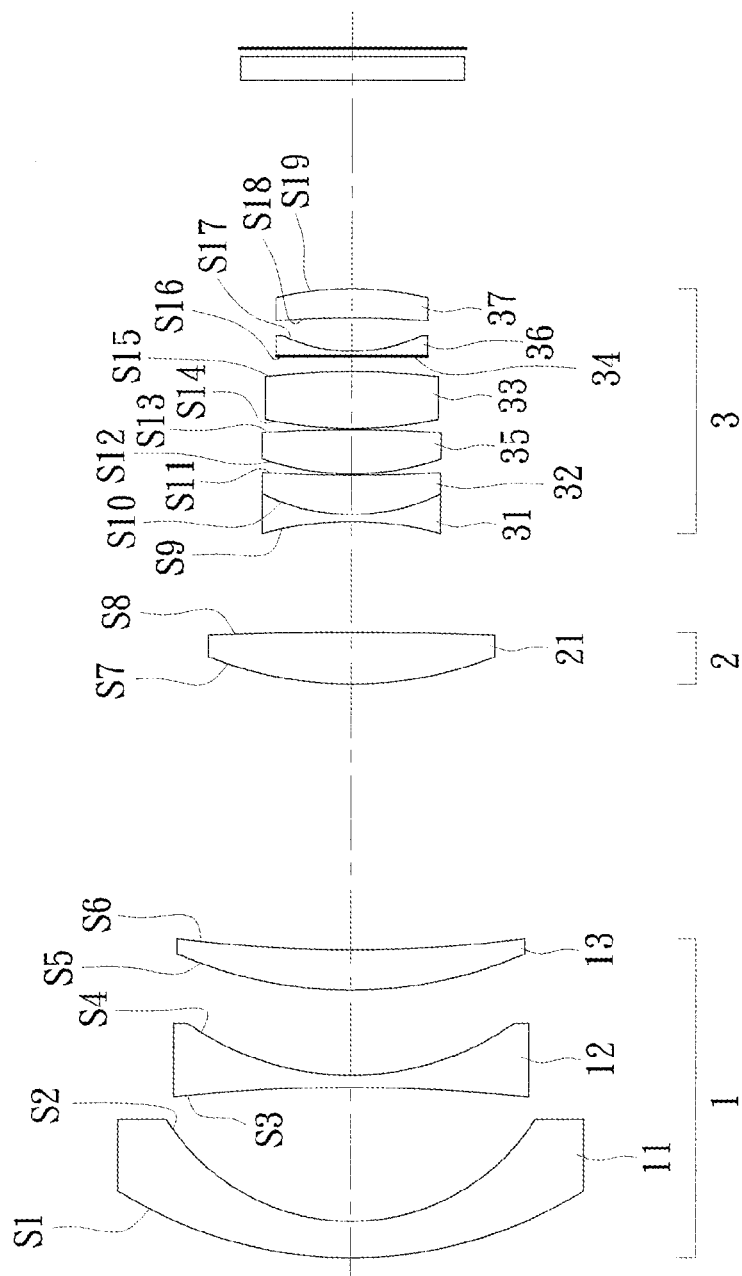
FIG. 1 is an arrangement diagram of a first preferred embodiment of the present invention.

The detailed description and technical contents of the present invention will be explained with reference to the accompanying drawings. However, the drawings are illustrative only but not used to limit the present invention.

Before the description of the present invention, it is noted that the similar elements are labeled with the same reference numerals in the preferred embodiments.

As shown in FIG. 1, a zoom projection lens for a projector of the preferred embodiment of the present invention includes a first lens group 1, a second lens group 2, and a third lens group 3 in order from an object side to an image side, and they respectively have negative refractive power, positive refractive power, and positive refractive power to enlarge the zoom ratio.

The first lens group 1 includes a plastic aspheric lens 11, a glass spherical biconcave lens 12, and a glass spherical convex lens 13 in sequence from the object side to the image side. The aspheric lens 11 is a negative meniscus lens with its convex side facing the object side. The aspheric lens 11 may shorten a total length of the zoom projection lens, correct the longitudinal aberration, and reduce the number of the lenses.

The second lens group 2 may include one or two glass spherical convex lens(es) 21.

The third lens group 3 includes a negative lens 31 and a positive lens 32 bonded together, and further includes a glass aspheric lens 33 and an aperture stop 34. The glass aspheric lens 33 may shorten a total length of the zoom projection lens, correct the longitudinal aberration, and reduce the number of the lenses.

F-number (F#) of the zoom projection lens in wide-angle is less than 2.1, which means it enlarges a diameter of the aperture 34 to increase the light efficiency of the projector.

The zoom projection lens further has the following conditions:

$$1.20 < |ex/bf| < 1.36 \quad (1)$$

$$2.0 < |f_1/f_w| < 2.45 \quad (2)$$

$$1.5 < |f_2/f_w| < 2.7 \quad (3)$$

$$2.1 < |f_3/fw| < 4.6 \quad (4)$$

$$3.1 < |f_{L1}/f_w| < 4.5 \quad (5)$$

$$0.31 < |f_4/f_3| < 0.65 \quad (6)$$

$$0.31 < |v_1/v_2| < 0.49 \quad (7)$$

where ex is exit pupil position; bf is a back focus length of the zoom projection lens; $f_w$ is a focus length of the zoom projection lens in wide-angle; $f_1$ is a focus length of the first length group 1; $f_2$ is a focus length of the second length group 2; $f_3$ is a focus length of the third length group 3; $f_2$ is a focus length of the aspheric lens 11 of the first length group 1; $f_4$ is a focus length of the aspheric lens 33 of the third length group 3; $v_1$ is extinction coefficient of the negative lens 31 of the third length group 3; and $v_2$ is extinction coefficient of the positive lens 32 of the third length group 3.

If the zoom projection lens satisfies the equation (1), it may increase the back focus length bf of the zoom projection lens and therefore increase the zoom ratio from wide-angle to telephoto. If the zoom projection lens satisfies the equation (2) to the equation (6), it may shorten a total length of the zoom projection lens and correct the image aberration. If the zoom projection lens satisfies the equation (7), it may correct the image aberration. If the zoom projection lens satisfies the equation (5) to the equation (7), it may enhance the image resolution. It may compensate the low quality of the image because of temperature through a distance between the first lens group 1 and the second lens group 2 and the back focus length bf.

First Preferred Embodiment

Table 1-1 shows parameters of the zoom projection lens of the first preferred embodiment. In the first preferred embodiment, the convex lens 13 of the first lens group 1 is a positive meniscus lens with its convex side facing the object side. The second lens group 2 has a glass spherical biconvex lens 21. The third lens group 3 includes a spherical biconvex lens 35 between the compound lenses 31, 32 and the aspheric lens 33, and further includes the aperture stop 34, a spherical biconcave lens 36, and a convex lens 37 in sequence from the aspheric lens 33 to the image side. The convex side of the convex lens 37 faces the image side.

The exit pupil position ex is −37.6304 mm; the back focus length bf is 31.0 mm; the focus length $f_w$ of the zoom projection lens in wide-angle is 21.05041 mm; the focus length $f_1$ of the first lens group 1 is −51.6057 mm; the focus length $f_2$ of the second lens group 2 is 52.8869 mm; the focus length $f_{L1}$ of the aspheric lens 11 of the first length group 1 is −88.4085 mm; the focus length $f_4$ of the aspheric lens 33 of the third length group 3 is 33.5388 mm; the extinction coefficient $v_1$ of the negative lens 31 of the third length group 3 is 30.13; and the extinction coefficient $v_2$ of the positive lens 32 of the third length group 3 is 81.55 which satisfies the equation (1) to the equation (7).

The F-numbers from wide-angle, middle to telephoto respectively are 2.0, 2.217, and 2.428, the focus lengths from wide-angle, middle to telephoto respectively are 21.5041 mm, 26.7915 mm, 32.0464 mm, and the width of the aperture stop 34 is 18.5 mm.

TABLE 1-1

| surface | radius of curvature (mm) | thickness (mm) | refractive index | extinction coefficient |
|---|---|---|---|---|
| S1 | 70.79 | 4.23 | 1.525 | 56.40 |
| S2 | 27.57 | 16.64 | | |
| S3 | −202.12 | 1.50 | 1.620 | 36.26 |
| S4 | 35.06 | 10.50 | | |
| S5 | 54.18 | 4.78 | 1.847 | 23.78 |
| S6 | 168.63 | 32.528 (wide angle) 14.164 (middle) 1.898 (telephoto) | | |
| S7 | 47.75 | 6.31 | 1.806 | 40.92 |
| S8 | −413.18 | 13.60 | | |

TABLE 1-1-continued

| surface | radius of curvature (mm) | thickness (mm) | refractive index | extinction coefficient |
|---|---|---|---|---|
| | | (wide angle) 14.132 (middle) 14.782 (telephoto) | | |
| S9 | −41.41 | 0.80 | 1.699 | 30.13 |
| S10 | 24.79 | 4.82 | 1.497 | 81.55 |
| S11 | 180.95 | 0.10 | | |
| S12 | 31.51 | 5.50 | 1.729 | 54.68 |
| S13 | −134.78 | 0.14 | | |
| S14 | 42.43 | 6.98 | 1.804 | 40.48 |
| S15 | −70.55 | 0.10 | | |
| S16 | 264.81 | 0.70 | 1.593 | 35.31 |
| S17 | 19.46 | 4.18 | | |
| S18 | −101.55 | 3.59 | 1.497 | 81.55 |
| S19 | −36.89 | 27.0 | | |

The aspheric surfaces may be obtained by following equation:

$$D = \frac{C \cdot H^2}{1 + \sqrt{1 - (1+K) \cdot C^2 \cdot H^2}} + E_4 \cdot H^4 + E_6 \cdot H^6 + E_8 \cdot H^8 + E_{10} \cdot H^{10} + E_{12} \cdot H^{12} + E_{14} \cdot H^{14} + E_{16} \cdot H^{16}$$

For a reference point of a top of the surface, D is a displacement in the optical axis from a height H to the optical axis; K is conic coefficient; C is reciprocal of radius of curvature; $E_4$ to $E_{16}$ are coefficients of high-order aspheric surfaces; the coefficients of the aspheric lenses 11, 33 of the first and the third lens groups 1, 3 are shown in the table 1-2:

TABLE 1-2

| surface | K | $E_4$ | $E_6$ | $E_8$ |
|---|---|---|---|---|
| S1 | 3.566194 | 4.74E−06 | −5.62E−09 | 2.56E−12 |
| S2 | 0.13161 | 5.00E−06 | −3.89E−09 | 4.90E−12 |
| S14 | −4.05937 | −5.79E−06 | −1.34E−08 | −1.97E−10 |
| S15 | −28.0347 | −4.82E−06 | 7.86E−10 | −2.30E−10 |

| surface | $E_{10}$ | $E_{12}$ | $E_{14}$ | $E_{16}$ |
|---|---|---|---|---|
| S1 | −1.83E−15 | 4.26E−19 | 4.21E−22 | −8.87E−25 |
| S2 | −4.24E−14 | 5.09E−17 | 8.56E−21 | −9.82E−23 |
| S14 | 8.40E−13 | −1.84E−15 | 0 | 0 |
| S15 | 1.17E−12 | −2.63E−15 | 0 | 0 |

Figure 2:
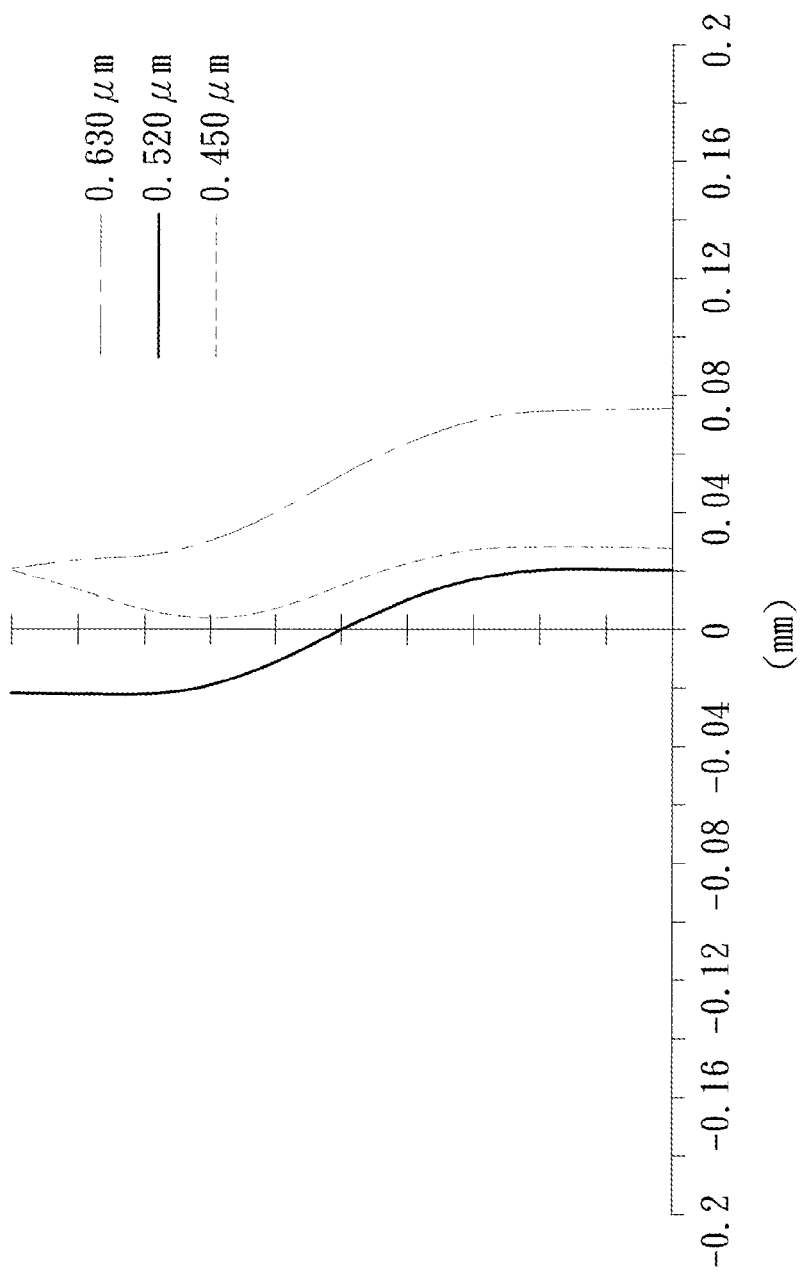
FIG. 2 is a longitudinal aberration diagram in wide-angle of the first preferred embodiment of the present invention.
Figure 3:
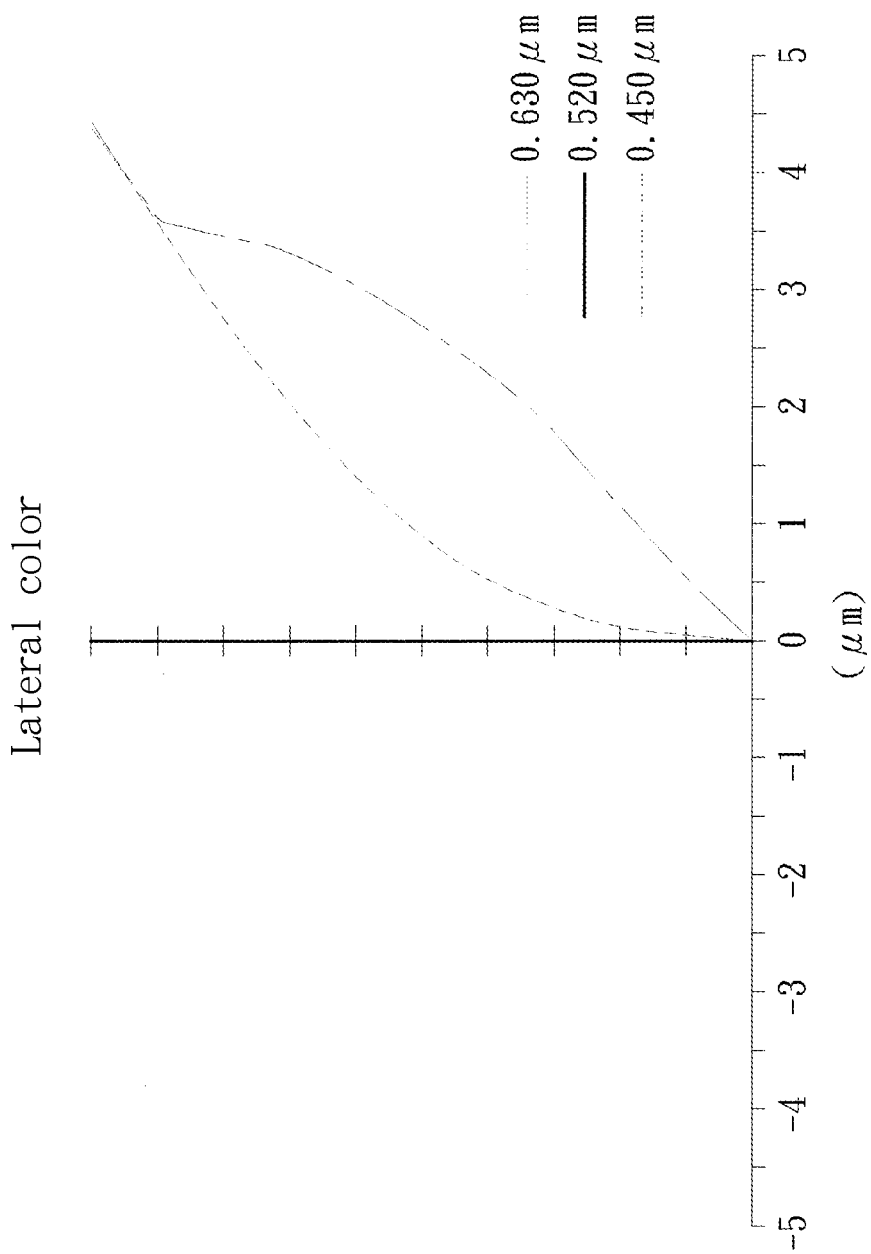
FIG. 3 is a lateral color diagram in wide-angle of the first preferred embodiment of the first present invention.
Figure 4:
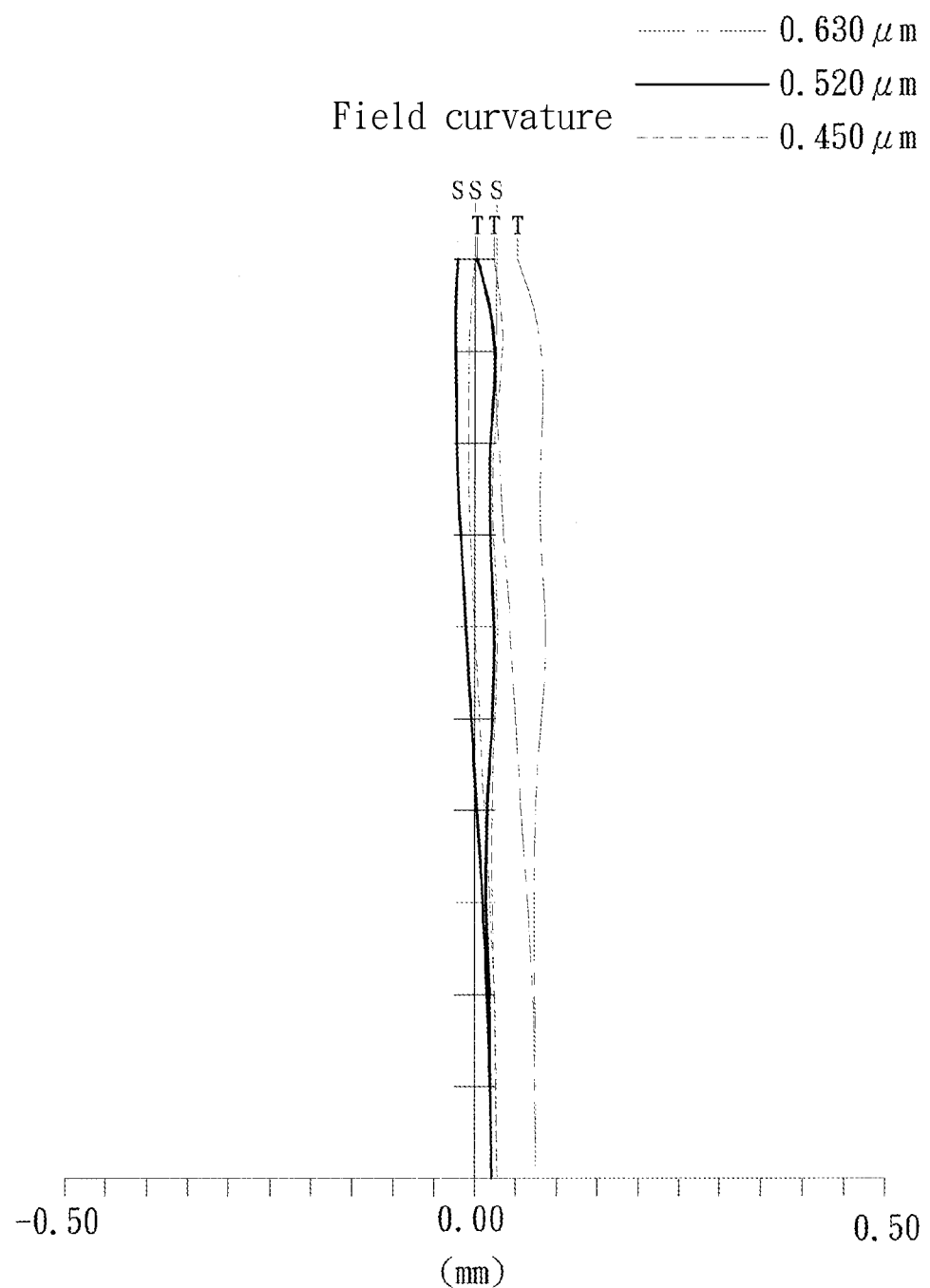
FIG. 4 is a field diagram in wide-angle of the first preferred embodiment of the first present invention.
Figure 5:
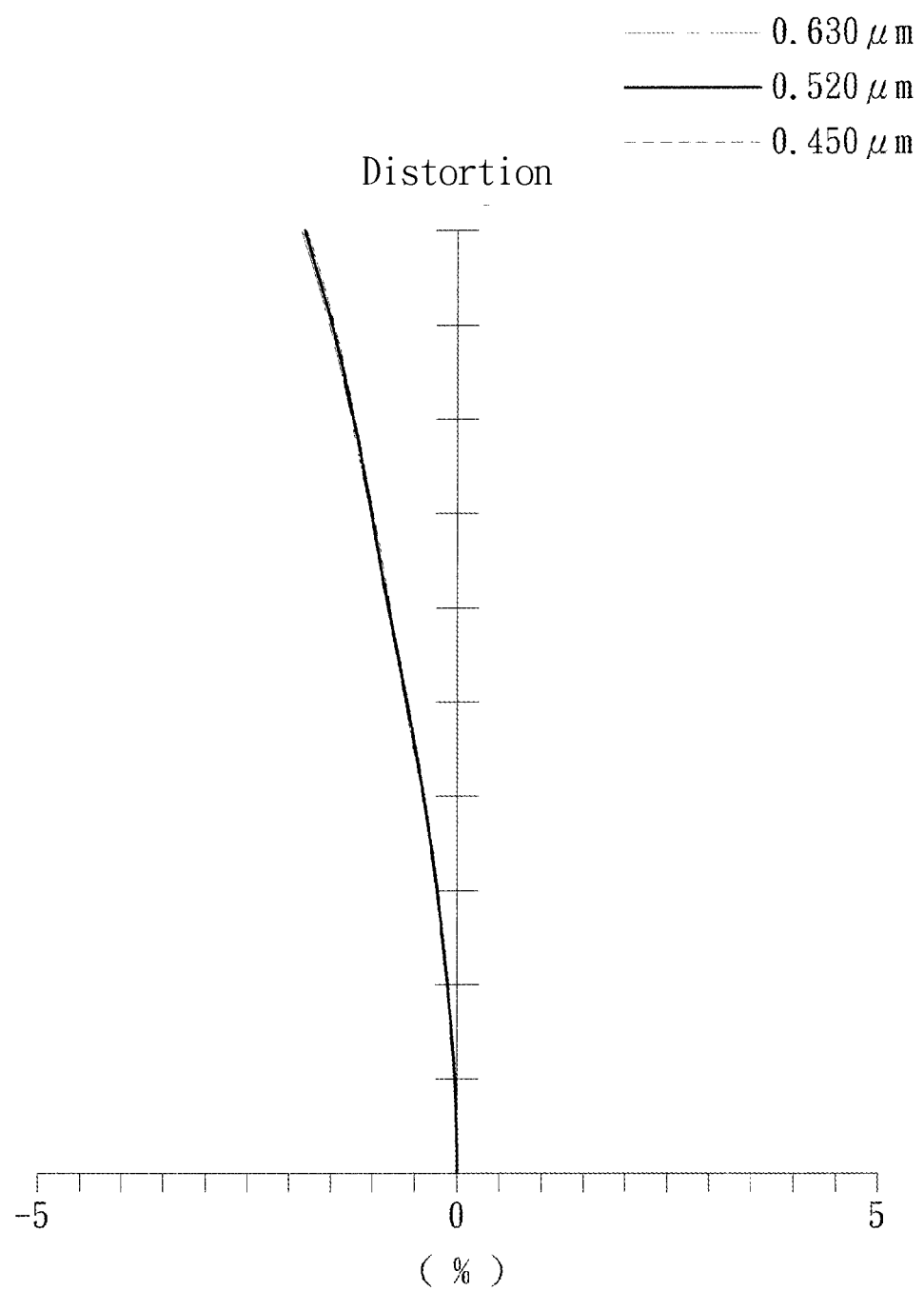
FIG. 5 is a distortion diagram in wide-angle of the first preferred embodiment of the first present invention.
Figure 6:
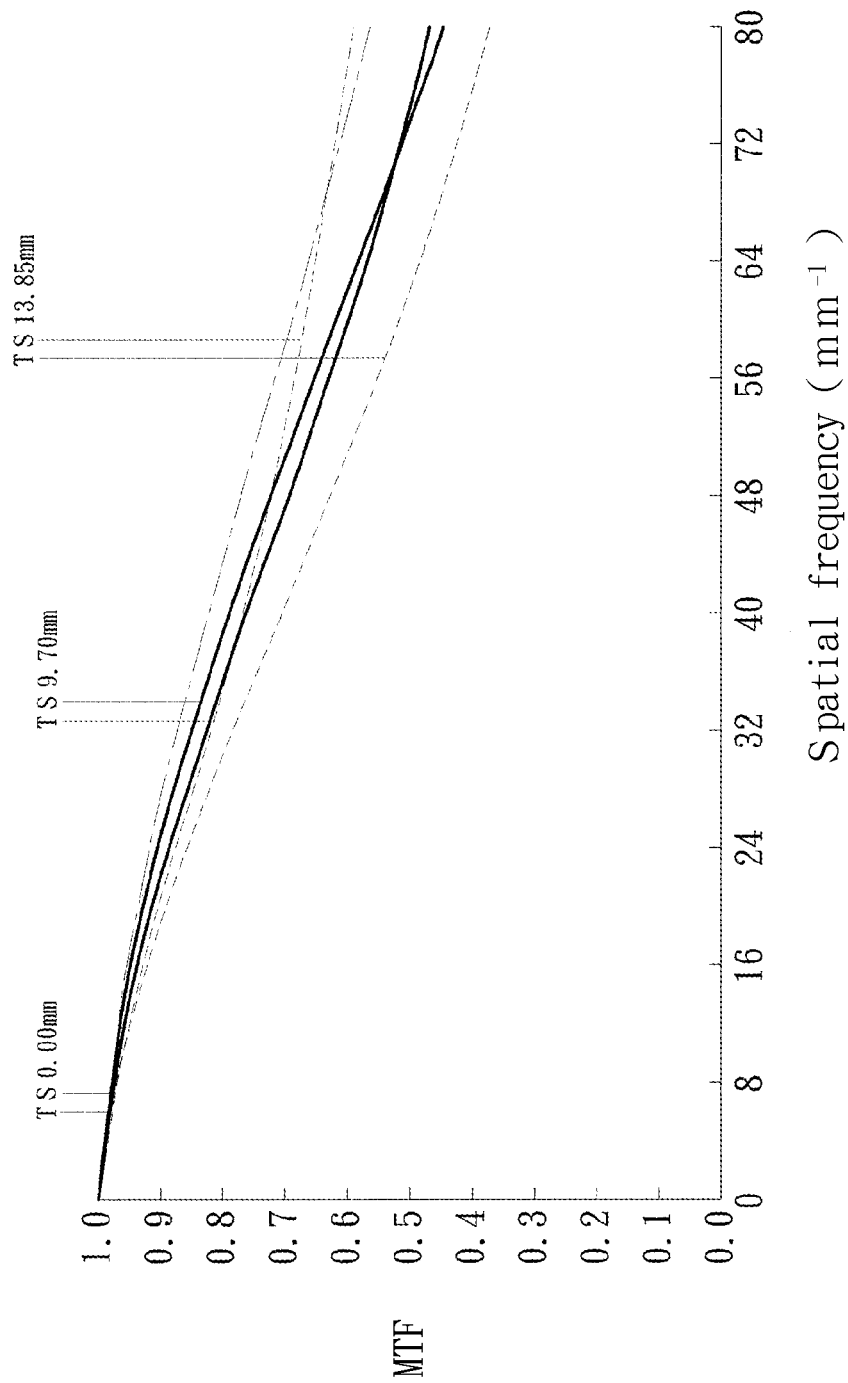
FIG. 6 is a MTF diagram in wide-angle of the first preferred embodiment of the present invention.
Figure 7:
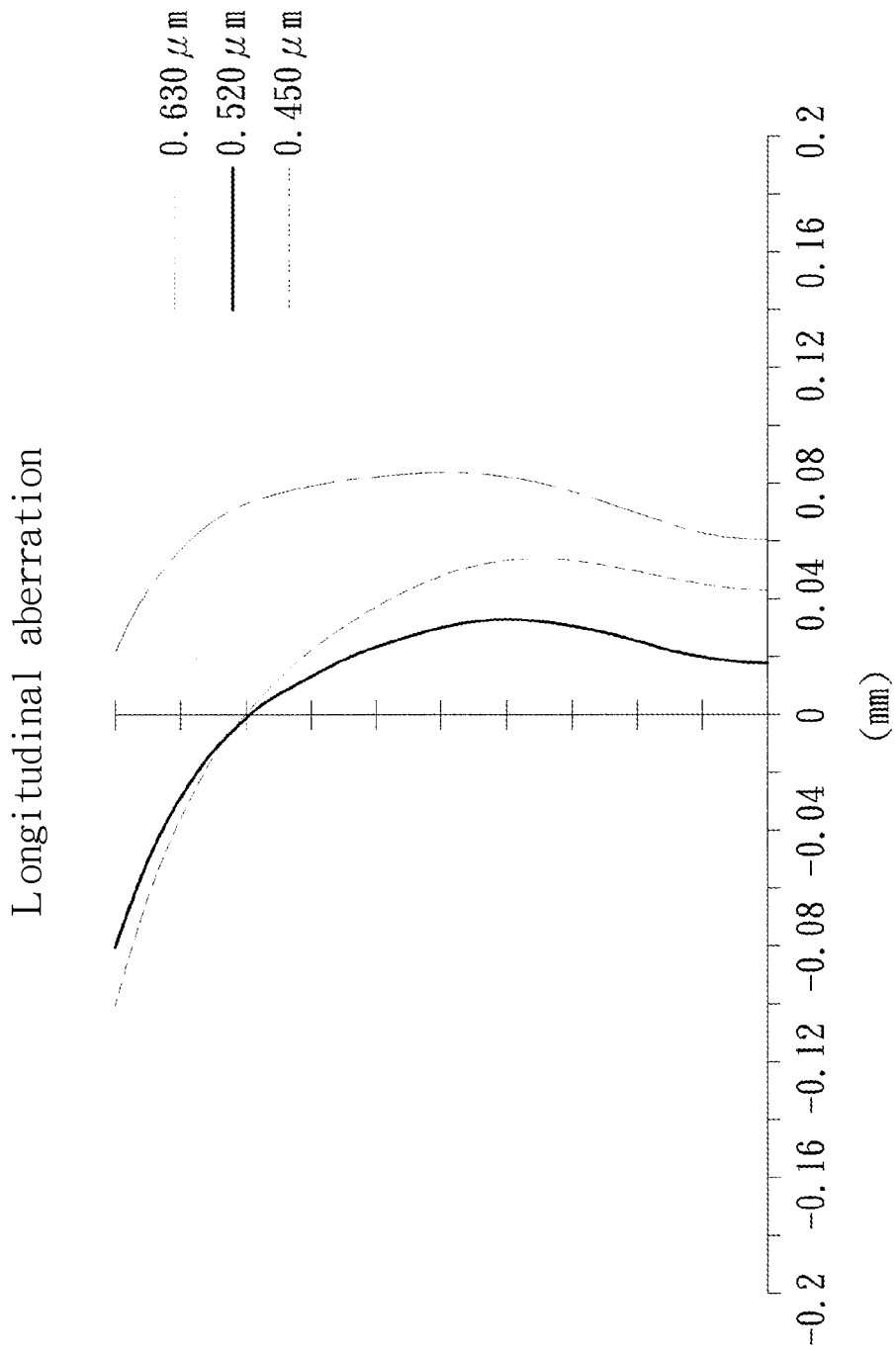
FIG. 7 is a longitudinal aberration diagram in telephoto of the first preferred embodiment of the present invention.
Figure 8:
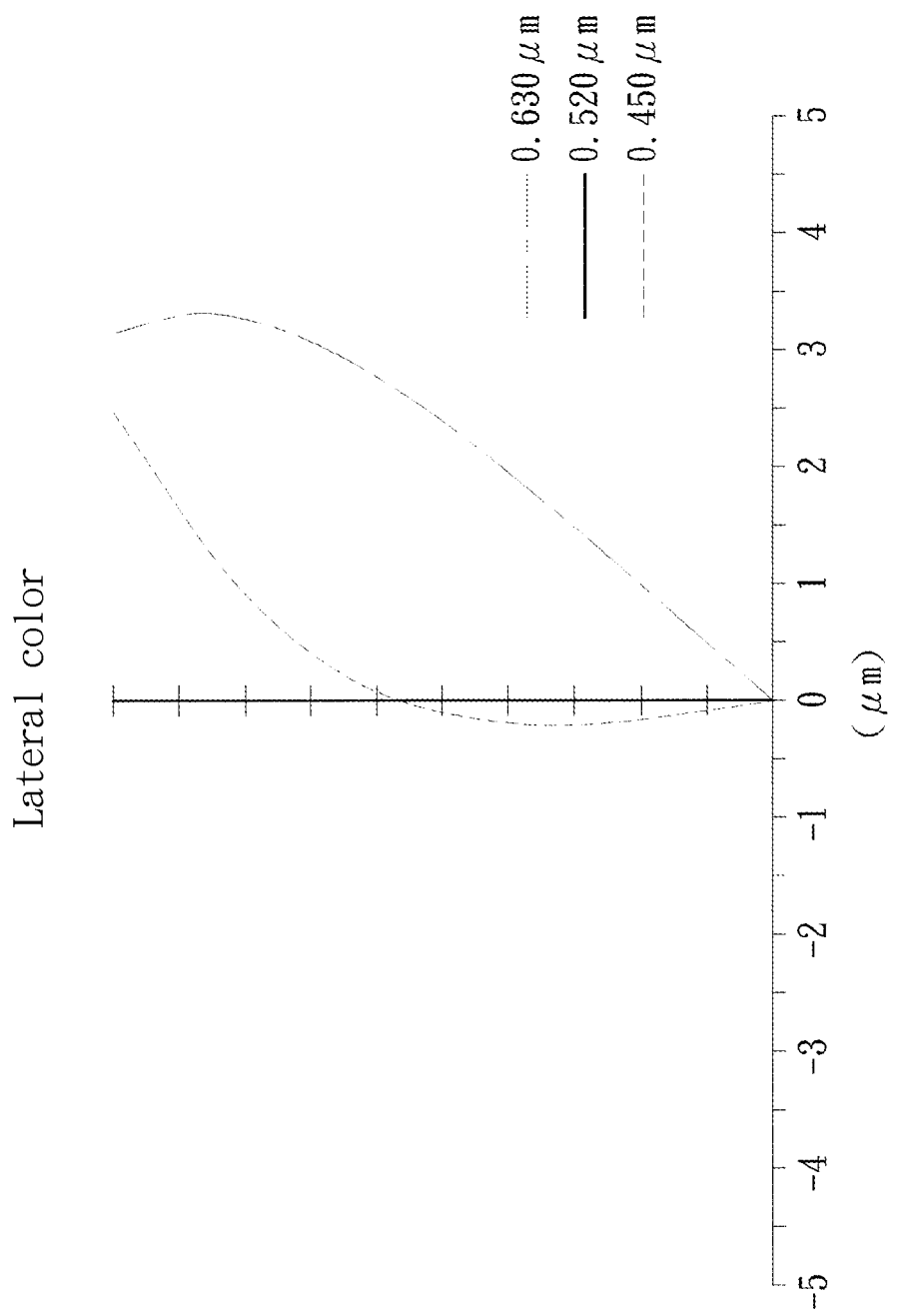
FIG. 8 is a lateral color diagram in telephoto of the first preferred embodiment of the first present invention.
Figure 9:
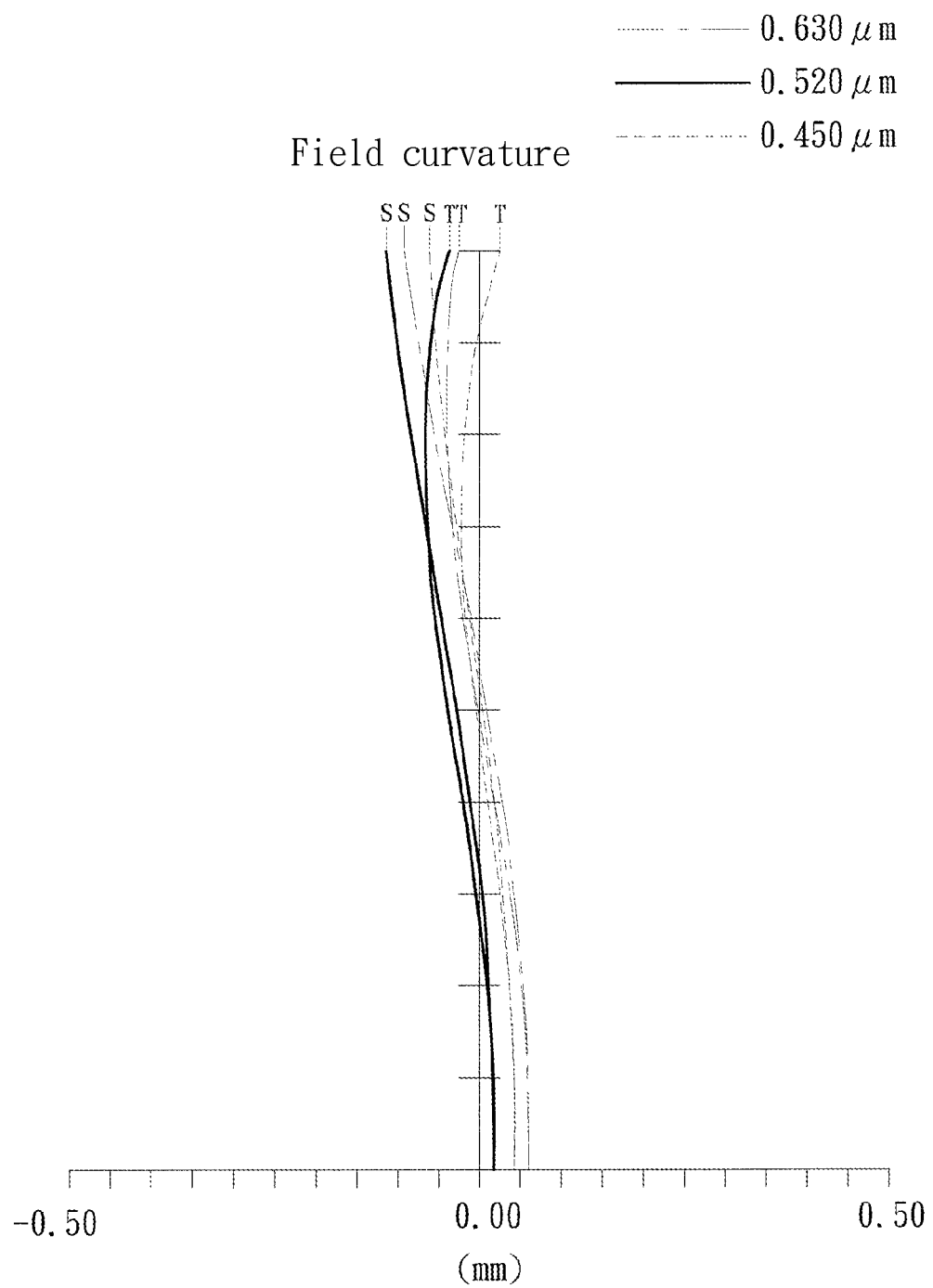
FIG. 9 is a field diagram in telephoto of the first preferred embodiment of the first present invention.
Figure 10:
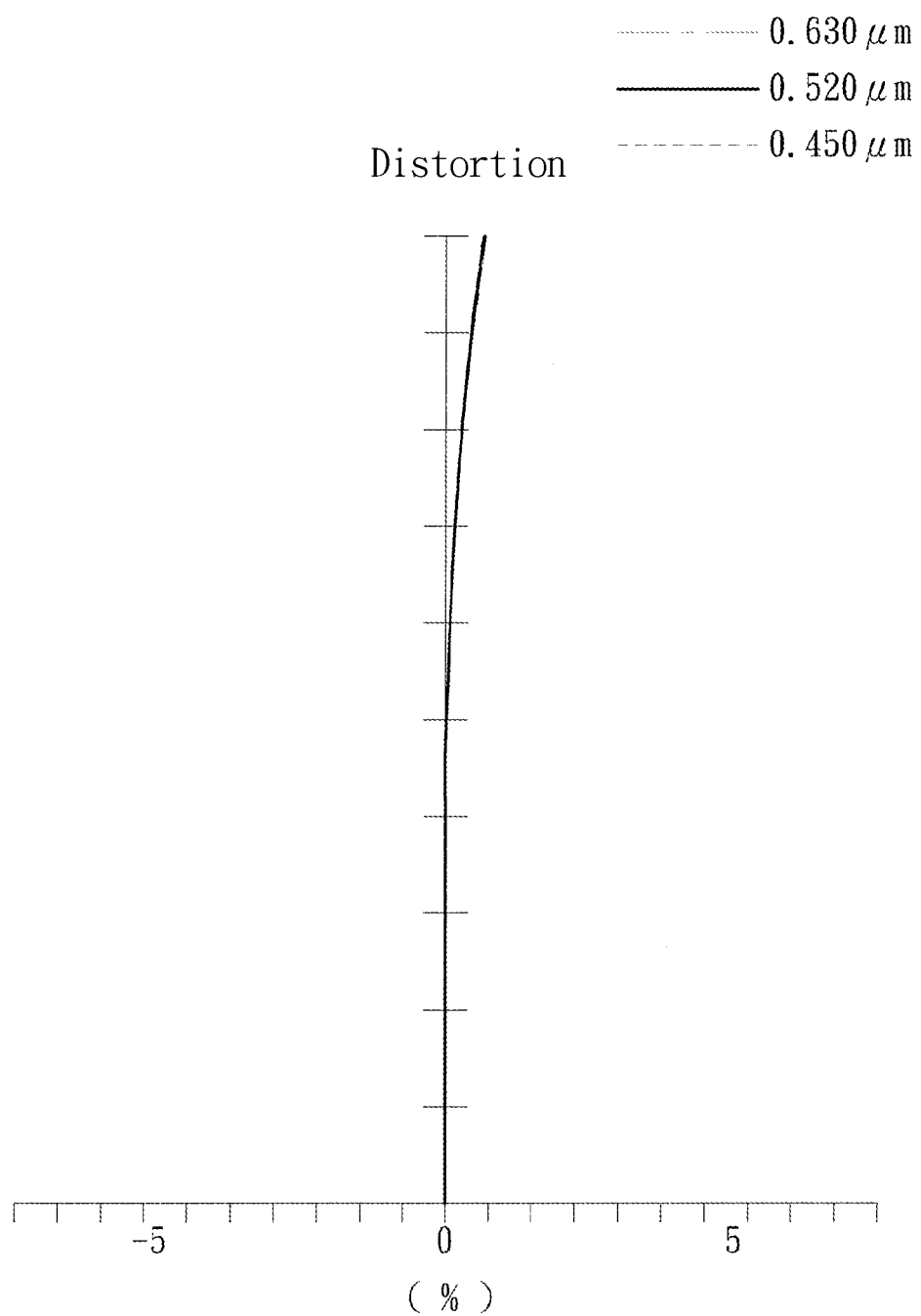
FIG. 10 is a distortion diagram in telephoto of the first preferred embodiment of the first present invention.
Figure 11:
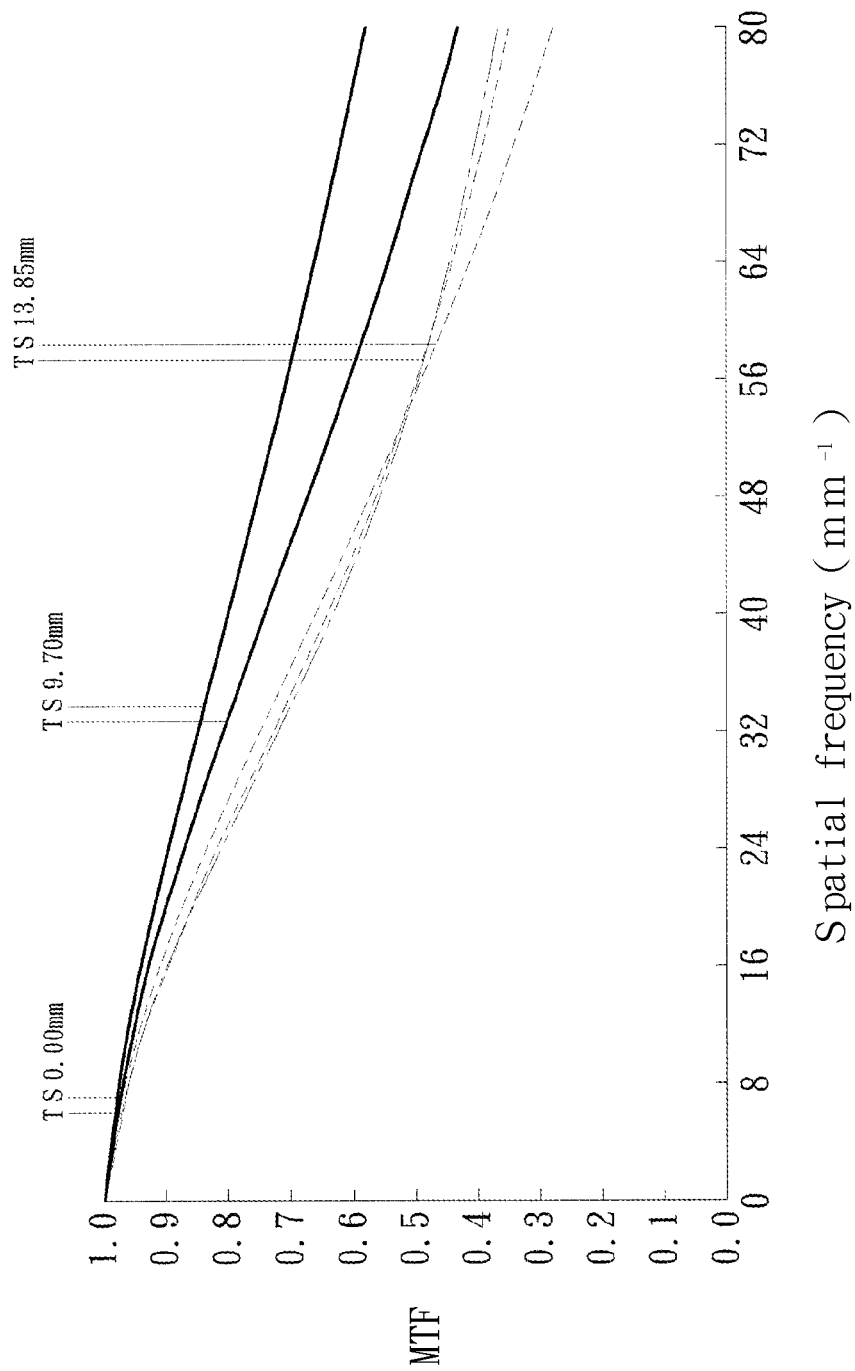
FIG. 11 is a MTF diagram in telephoto of the first preferred embodiment of the present invention.
Figure 12:
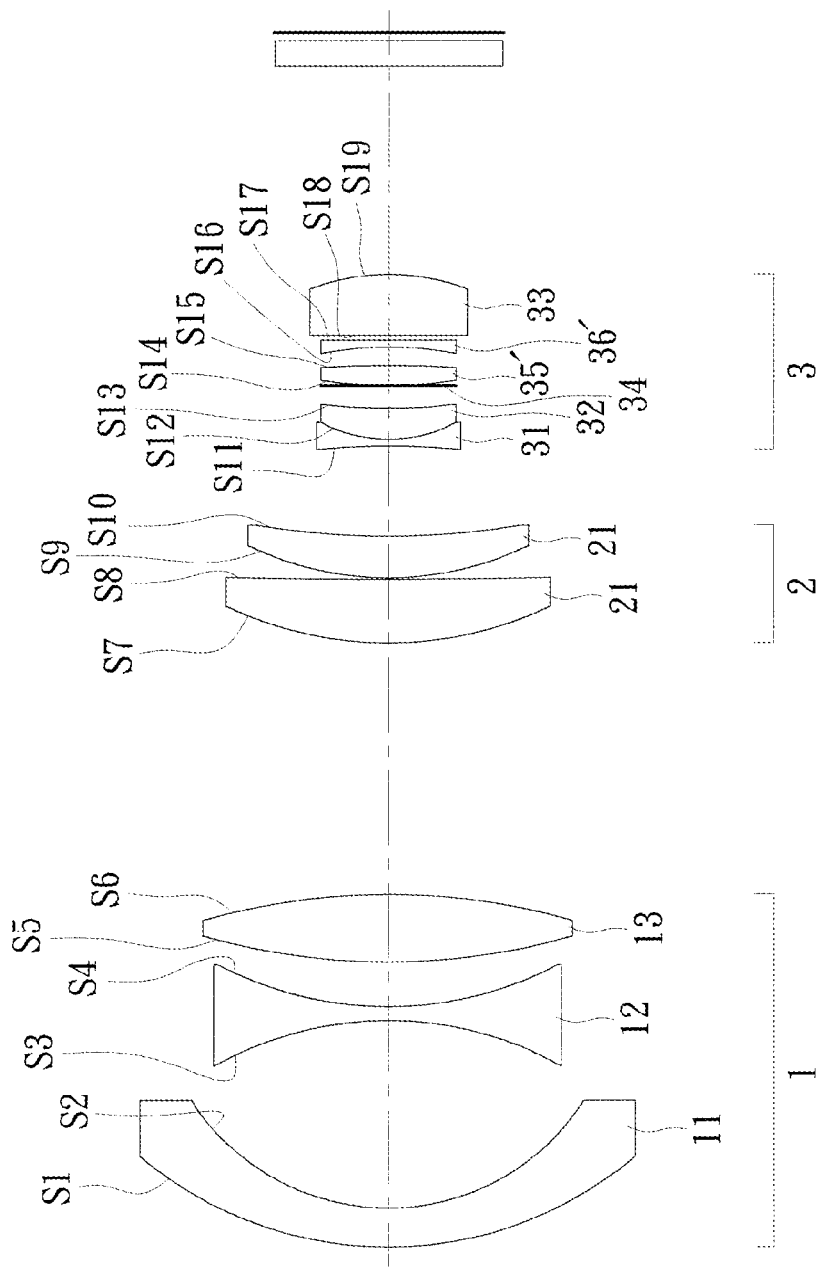
FIG. 12 is an arrangement diagram of a second preferred embodiment of the present invention.
Figure 13:
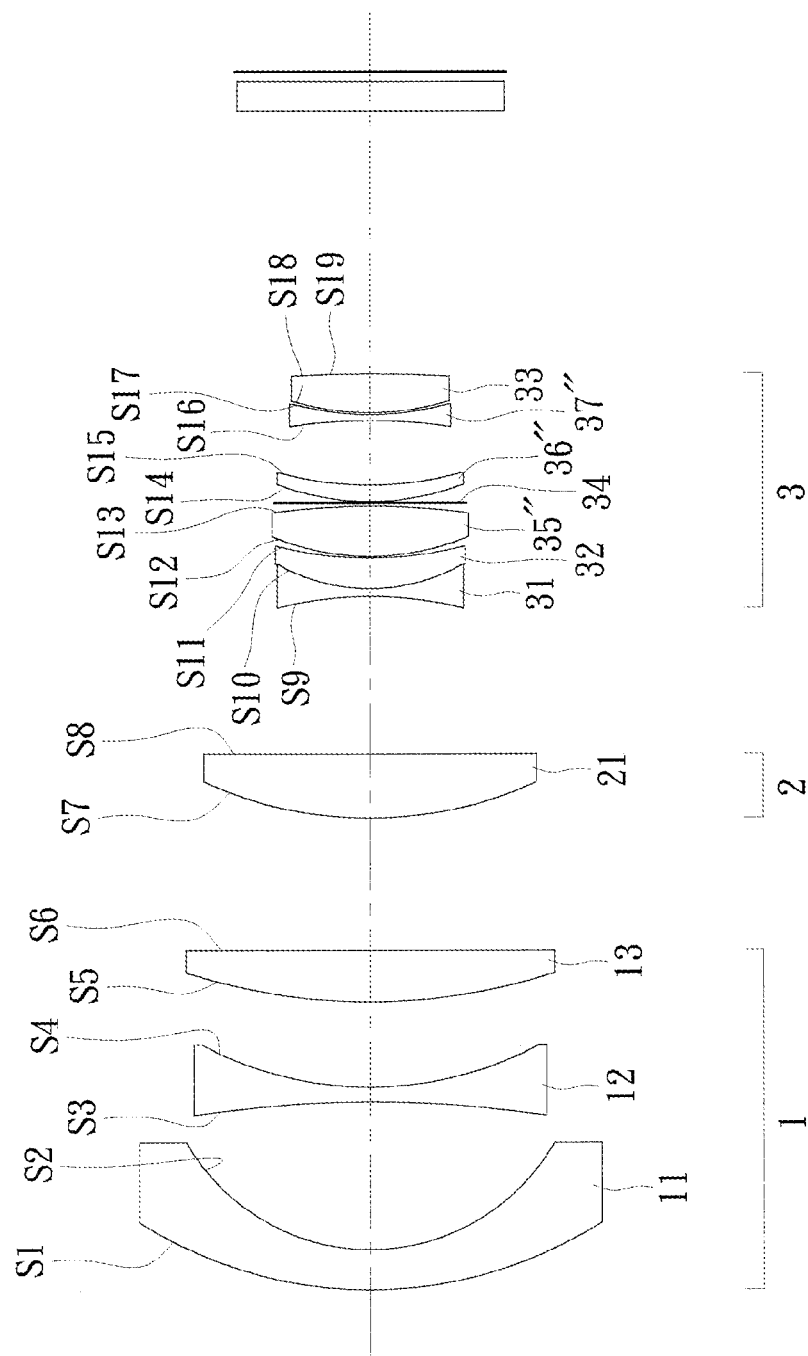
FIG. 13 is an arrangement diagram of a third preferred embodiment of the present invention.

The longitudinal aberration in wide-angle of the zoom projection lens of the first preferred embodiment is shown in FIG. 2, in which pupil radius is 5.6571 mm. FIG. 3 shows the lateral color, in which the highest half-height of image in vertical axis is 13.85 mm. FIG. 4 is field curvature diagram of non-point aberration, showing the image positions in different heights, where S is meridional ray, T is sagittal ray, x-coordinate is a distance between the image point and the idea image surface, and y-coordinate is idea image height. FIG. 5 is distortion diagram of distortion aberration, showing the transverse amplification, where x-coordinate is difference in percentage between the image point and the idea image surface and y-coordinate is idea image height. FIG. 6 is modulation transfer function (MTF) diagram, showing the modulus of the OTF (optical transfer function) relative to the change of spatial frequency.

The longitudinal aberration diagram, lateral color diagram, field diagram, distortion diagram, and MTF diagram in telephoto of the first preferred embodiment are shown in FIG. 7 to FIG. 11.

According to FIG. 2 to FIG. 11, longitudinal aberration, chromation difference of magnification, non-point aberration, and distortion of the first preferred embodiment are acceptable, which means that the first preferred embodiment has a good optical resolving power.

Second Preferred Embodiment

Table 2-1 shows parameters of the zoom projection lens of the second preferred embodiment. In the second preferred embodiment, the convex lens 13 of the first lens group 1 is a biconvex lens. The second lens group 2 has two glass positive meniscus lenses 21. The third lens group 3 further includes the aperture stop 34, a spherical biconvex lens 35', and a spherical biconcave lens 36' between the compound lens 31, 32 and the aspheric lens 33.

The exit pupil position ex is −42.0 mm; the back focus length bf is 31.0 mm; the focus length $f_w$ of the zoom projection lens in wide-angle is 20.6285 mm; the focus length $f_1$ of the first lens group 1 is −46.3177 mm; the focus length $f_2$ of the second lens group 2 is 33.9912 mm; the focus length $f_{L1}$ of the aspheric lens 11 of the first length group 1 is −91.7393 mm; the focus length $f_4$ of the aspheric lens 33 of the third length group 3 is 29.2617 mm; the extinction coefficient $v_1$ of the negative lens 31 of the third length group 3 is 26.29; and the extinction coefficient $v_2$ of the positive lens 32 of the third length group 3 is 81.55 which satisfies the equation (1) to the equation (7).

The F-numbers from wide-angle, middle to telephoto respectively are 2.023, 2.212, and 2.404, the focus lengths from wide-angle, middle to telephoto respectively are 20.6285 mm, 25.7162 mm, 30.7785 mm, and the width of the aperture stop 34 is 16.2 mm.

TABLE 2-1

| surface | radius of curvature (mm) | thickness (mm) | refractive index | extinction coefficient |
|---|---|---|---|---|
| S1 | 72.19 | 4.77 | 1.525 | 56.40 |
| S2 | 28.35 | 23.17 | | |
| S3 | −40.76 | 1.50 | 1.722 | 29.23 |
| S4 | 44.89 | 5.57 | | |
| S5 | 85.12 | 7.70 | 1.847 | 23.78 |
| S6 | −91.33 | 30.845 (wide angle) 12.982 (middle) 1.086 (telephoto) | | |
| S7 | 44.41 | 7.92 | 1.729 | 54.68 |
| S8 | 907.51 | 0.10 | | |
| S9 | 38.08 | 5.20 | 1.806 | 40.93 |
| S10 | 107.72 | 11.020 (wide angle) 11.612 (middle) 12.278 (telephoto) | | |
| S11 | −78.06 | 0.70 | 1.785 | 26.29 |
| S12 | 16.94 | 3.75 | 1.497 | 81.55 |
| S13 | 54.62 | 1.15 | | |
| S14 | 44.77 | 2.49 | 1.652 | 58.55 |
| S15 | −108.29 | 2.26 | | |
| S16 | −46.22 | 0.70 | 1.699 | 30.13 |
| S17 | 309.43 | 0.66 | | |
| S18 | 152.58 | 7.50 | 1.804 | 40.48 |
| S19 | −27.54 | 27.0 | | |

The coefficients of the aspheric lenses 11, 33 of the first and the third lens groups 1, 3 are shown in the table 2-2:

TABLE 2-2

| surface | K | $E_4$ | $E_6$ | $E_8$ |
|---|---|---|---|---|
| S1 | 4.31251 | 3.67E−06 | −2.82E−09 | 3.96E−13 |
| S2 | 0.163559 | 2.65E−06 | −1.09E−08 | 3.94E−11 |
| S18 | −0.12591 | −2.59E−05 | −9.27E−08 | −1.27E−10 |
| S19 | 2.09276 | 3.00E−06 | −3.41E−08 | 3.47E−11 |

| surface | $E_{10}$ | $E_{12}$ | $E_{14}$ | $E_{16}$ |
|---|---|---|---|---|
| S1 | 3.96E−16 | 4.83E−19 | 2.77E−22 | −7.28E−25 |
| S2 | −1.18E−13 | 7.90E−17 | 1.62E−19 | −2.38E−22 |
| S18 | 8.50E−13 | −3.12E−14 | 0 | 0 |
| S19 | −5.10E−13 | −3.97E−15 | 0 | 0 |

Third Preferred Embodiment

Table 3-1 shows parameters of the zoom projection lens of the third preferred embodiment. In the third preferred embodiment, the convex lens 13 of the first lens group 1 is a plano-convex lens with its convex side facing the object side. The second lens group 2 has a glass spherical plano-convex lens 21. The third lens group 3 further includes a spherical biconvex lens 35", the aperture stop 34, a positive meniscus lens 36" with its convex side facing the object side, and a spherical biconcave lens 37" between the compound lens 31, 32 and the aspheric lens 33.

The exit pupil position ex is −41.737 mm; the back focus length bf is 31.0 mm; the focus length $f_w$ of the zoom projection lens in wide-angle is 23.4058 mm; the focus length $f_1$ of the first lens group 1 is −48.0972 mm; the focus length $f_2$ of the second lens group 2 is 50.4457 mm; the focus length $f_{L1}$ of the aspheric lens 11 of the first length group 1 is −73.0718 mm; the focus length $f_4$ of the aspheric lens 33 of the third length group 3 is 25.5686 mm; the extinction coefficient $v_1$ of the negative lens 31 of the third length group 3 is 30.13; and the extinction coefficient $v_2$ of the positive lens 32 of the third length group 3 is 81.55 which satisfies the equation (1) to the equation (7).

The F-numbers from wide-angle, middle to telephoto respectively are 2.071, 2.204, and 2.249, the focus lengths from wide-angle, middle to telephoto respectively are 23.4058 mm, 26.8620 mm, 28.0111 mm, and the width of the aperture stop 34 is 19.5 mm.

TABLE 3-1

| surface | radius of curvature (mm) | thickness (mm) | refractive index | extinction coefficient |
|---|---|---|---|---|
| S1 | 37.50 | 4.23 | 1.525 | 56.40 |
| S2 | 18.29 | 15.02 | | |
| S3 | −112.85 | 15.02 | 1.699 | 30.13 |
| S4 | 37.15 | 8.62 | | |
| S5 | 58.92 | 5.33 | 1.847 | 23.78 |
| S6 | ∞ | 13.605 (wide angle) 3.749 (middle) 0.998 (telephoto) | | |
| S7 | 41.08 | 6.64 | 1.806 | 40.93 |
| S8 | ∞ | 16.106 (wide angle) 16.566 (middle) 16.720 (telephoto) | | |
| S9 | −39.65 | 0.8 | 1.699 | 30.13 |
| S10 | 18.84 | 0.8 | 1.497 | 81.55 |
| S11 | 37.93 | 0.10 | | |

TABLE 3-1-continued

| surface | radius of curvature (mm) | thickness (mm) | refractive index | extinction coefficient |
|---|---|---|---|---|
| S12 | 24.09 | 5.25 | 1.729 | 54.68 |
| S13 | −71.45 | 0.30 | | |
| aperture stop | — | 0.10 | — | — |
| S14 | 25.54 | 1.78 | 1.788 | 47.37 |
| S15 | 37.64 | 6.65 | | |
| S16 | −48.93 | 0.60 | 1.640 | 34.47 |
| S17 | 32.57 | 0.16 | | |
| S18 | 29.34 | 4.0 | 1.804 | 40.48 |
| S19 | −66.83 | 27.0 | | |

The coefficients of the aspheric lenses of the first and the third lens groups are shown in the table 3-2:

TABLE 3-2

| surface | K | $E_4$ | $E_6$ | $E_8$ |
|---|---|---|---|---|
| S1 | −5.6902 | 2.31E−06 | 6.16E−09 | −6.15E−12 |
| S2 | −0.4946 | −1.22E−05 | 2.25E−08 | −1.38E−11 |
| S18 | 2.116181 | −5.76E−06 | 6.92E−08 | 1.12E−09 |
| S19 | −67.9147 | 5.88E−06 | 2.95E−07 | 1.11E−09 |

| surface | $E_{10}$ | $E_{12}$ | $E_{14}$ | $E_{16}$ |
|---|---|---|---|---|
| S1 | −3.15E−15 | 8.42E−18 | −5.11E−22 | −2.66E−24 |
| S2 | −4.52E−14 | 1.14E−16 | −1.98E−19 | 2.11E−22 |
| S18 | −8.69E−13 | 4.04E−14 | 0 | 0 |
| S19 | −6.71E−12 | 1.27E−13 | 0 | 0 |

In conclusion, the conventional light sources are replaced by LED because LED is well developed, and has high stability, long product life, and low cost. The brightness of LED is lower than high pressure mercury lamp so that it must enlarge the diameter of the aperture stop 34 to increase the optical efficiency of the projector when LED is applied in projector.

Besides, the aspheric lenses 11, 33 may shorten a total length of the zoom projection lens, correct the longitudinal aberration, and reduce the number of the lenses to achieve the objective of the present invention.

The description above is a few preferred embodiments of the present invention and the equivalence of the present invention is still in the scope of claim construction of the present invention.

What is claimed is:

1. A zoom projection lens for a projector, in order along an optical axis from an object side to an image side, comprising:
   a first lens group having a negative refractive power;
   a second lens group having a positive refractive power;
   a third lens group having a positive refractive power;
   wherein the first lens group has an aspheric lens, the third lens group has an aspheric lens and an aperture stop, and F-number of the zoom projection lens in wide-angle is less than 2.1; and
   wherein the third lens group further includes a negative lens and a positive lens, and the third lens group includes the negative lens, the positive lens, and the aspheric lens in order from the object side to the image side.

2. The zoom projection lens as defined in claim 1, wherein the zoom projection lens satisfies an equation of $1.20<|ex/bf|<1.36$, where ex is exit pupil position, and bf is a back focus length of the zoom projection lens.

3. The zoom projection lens as defined in claim 1, wherein the zoom projection lens satisfies an equation of $2.0<|f_1/f_w|<2.45$, where $f_1$ is a focus length of the first length group, and $f_w$ is a focus length of the zoom projection lens in wide-angle.

4. The zoom projection lens as defined in claim 1, wherein the zoom projection lens satisfies an equation of $1.5<|f_2/f_w|<2.7$, where $f_2$ is a focus length of the second length group, and $f_w$ is a focus length of the zoom projection lens in wide-angle.

5. The zoom projection lens as defined in claim 1, wherein the zoom projection lens satisfies an equation of $2.1<|f_3/f_w|<4.6$, where $f_3$ is a focus length of the third length group, and $f_w$ is a focus length of the zoom projection lens in wide-angle.

6. The zoom projection lens as defined in claim 1, wherein the zoom projection lens satisfies an equation of $3.1<|f_{L1}/f_w|<4.5$, where $f_{L1}$ is a focus length of the aspheric lens of the first length group, and $f_w$ is a focus length of the zoom projection lens in wide-angle.

7. The zoom projection lens as defined in claim 6, wherein the first lens group includes the aspheric lens and two spherical lenses in order from the object side to the image side.

8. The zoom projection lens as defined in claim 1, wherein the zoom projection lens satisfies an equation of $0.31<|f_4/f_3|<0.65$, where $f_4$ is a focus length of the aspheric lens of the third length group, and $f_3$ is a focus length of the third length group.

9. The zoom projection lens as defined in claim 8, wherein the negative lens and the positive lens are bonded together, and the zoom projection lens satisfies an equation of $0.31<|v_1/v_2|<0.49$, where $v_1$ is extinction coefficient of the negative lens of the third length group, and $v_2$ is extinction coefficient of the positive lens of the third length group.

* * * * *